United States Patent
Grigat et al.

[15] 3,658,623
[45] Apr. 25, 1972

[54] PROCESS FOR BONDING NON-POROUS MATERIALS BY MEANS OF POLYFUNCTIONAL AROMATIC CYANIC ACID ESTERS

[72] Inventors: Ernst Grigat; Heinz Schultheis, both of Koeln-Stammheim; Eugen Bock, Leverkusen; Manfred Dollhausen, Hitdorf, all of Germany

[73] Assignee: Farbenfabriken Bayer Aktiengesellschaft, Leverkusen, Germany

[22] Filed: July 14, 1969

[21] Appl. No.: 841,543

Related U.S. Application Data

[63] Continuation-in-part of Ser. No. 824,248, May 13, 1969, abandoned.

[30] Foreign Application Priority Data

May 24, 1968    Germany................P 17 69 440.5

[52] U.S. Cl..............................156/331, 161/190, 156/283, 156/321
[51] Int. Cl. ........................................................C09j 3/16
[58] Field of Search.................260/858, 77.5, 150; 156/331, 156/283, 321

[56] References Cited

UNITED STATES PATENTS

| | | | |
|---|---|---|---|
| 3,037,979 | 6/1962 | Fukui et al............................260/248 |
| 3,053,796 | 9/1962 | D'Alelio.............................156/331 X |
| 3,205,200 | 9/1965 | Bunge et al........................260/77.5 X |
| 3,206,352 | 9/1965 | Gollis et al................................161/93 |
| 3,491,060 | 1/1970 | Schminke et al. .......................260/47 |
| 3,502,617 | 3/1970 | Schminke et al. .......................260/47 |

Primary Examiner—Carl D. Quarforth
Assistant Examiner—E. A. Miller
Attorney—Connolly and Hutz

[57] ABSTRACT

Non-porous materials are bounded by introducing between the surfaces to be bonded monomeric polyfunctional aromatic cyanic acid esters resp. their prepolymers obtained by heat treatment of the monomeric compounds, fixing the surfaces to be bonded in the required position under intimate contact and heating the bond for a sufficient period of time up to 250° C.

4 Claims, No Drawings

PROCESS FOR BONDING NON-POROUS MATERIALS BY MEANS OF POLYFUNCTIONAL AROMATIC CYANIC ACID ESTERS

This application is a continuation-in-part of application Ser. No. 824,248, filed May 13, 1969, now abandoned.

Adhesives based on a variety of polymers are available for bonding non-porous materials. They are used, depending on practical requirements, for example, in regard to the strength and stability of the bonds under the influence of, for example, water, acids, alkalis, salt solutions, oils, fats or various kinds of organic solvents.

Particular importance is attached to the strength of the bonds and the elasticity of the adhesive layers within the widest possible range of temperatures because in numerous fields, for example in air and space travel, bonds in non-porous materials are exposed both to very high and to relatively low temperatures. A few of the known adhesives, for example those based on polyurethanes, give bonds which though very strong at low temperatures (e.g. $-50°$ to $-100°$ C) deteriorate to a level that is completely inadequate for practical require-ments at temperatures in the range from 100 to 200° C. Bonds employing other adhesives, for example those based on epoxy resins, show outstanding strength at temperatures in the range from 100° to 300°C, although their strength deteriorates at relatively low temperatures to a considerable extent, especially under even minimal delamination or "peeling" stresses, to which bonds are always exposed in practice, particularly because the elasticity of the adhesive layer is greatly reduced at these temperatures.

It has now been found that non-porous materials can be bonded by introducing between the materials to be bonded polyfunctional aromatic cyanic acid esters, or preferably prepolymers obtained therefrom by pretreatment under heat, and heating the bond to adequate temperatures over a prolonged period.

The bonds thus obtained show a substantially uniform high level of strength, coupled with outstanding (and again substantially uniform elasticity, at temperatures in a wide range from below $-100°$ C to above $+300°$ C. During the heating period, the polyfunctional aromatic cyanic acid esters used change into highly crosslinked high molecular weight polytriazines.

The fact that they are easy to process and their outstanding storage stability, especially that of the prepolymers, are among the particular advantages of the cyanic acid esters used as adhesives in this process. These cyanic acid esters and their prepolymers yield bonds of high strength and thermal stability in the absence of any additives simply as a result of heating at an adequate temperature. This eliminates the danger of corrosion between the adhesive layer and the material setting in over a period of time under the influence of acidic or basic substances of the kind that have to be added to numerous conventional adhesives for the purposes of hardening and which considerably reduce the strength of bonds, between metals in particular, and in some instances eliminate it altogether. Due to the absence of of basic or acidic hardening agents, the bonds have also a high degree of resistance to cold and hot water, and to acids and alkalis. In many instances, the reactive cyanate groups in the adhesive also impart some adhesion to such materials as, for example, plastics that are resistant to high temperatures, to a degree that cannot be achieved with other adhesives.

The present invention relates to a process for bonding non-porous materials by a heat cured polymer of a polyfunctional aromatic cyanic acid ester.

Any suitable polyfunctional aromatic cyanic acid ester may be used in the process of the invention such as, for example, 1,3-dicyanato benzene, 1,4-dicyanato benzene, 1,3-, 1,4-, 1,5-, 1,6-, 1,7-, 1,8-, 2,6- or 2,7-dicyanatonaphthalene, 1,4-dicyanatoanthraquinone, 1,5-dicyanatoanthraquinone, 1,3,5-tricyanato-benzene, 1,3,5-, 1,3,6-, or 1,3,7-tricyanatonaphthalene, 2,2'-, 3,3'- or 4,4'-dicyanatodiphenyl, 2,2'- or 4,4'-dicyanatodinaphthyl-(1,1'), 1-methyl-3,5-dicyanatobenzene, 1-methyl-2,5-dicyanatobenzene, 4-acetyl-1,3-dicyanatobenzene, 4,4'-di-cyanatodiphenylmethane, 4,4'-dicyanatodiphenylmethylmethane, 4,4'-dicyanatodiphenyl-dimethylmethane, 1,1-bis-(4-cyanato-phenyl)-cyclohexane, 2,2'-dicyanatodinaphthyl-(1,1')-methane, )-methane, 4,4'-dicyanatodiphenylethane, 4,4'-dicyanatostilbene, 4,4'-dicyanatodiphenylether, 4,4'-dicyanatobenzophenon, 4,4'-dicyanatodiphenylsulfone. Preferably polyfunctional cyanic acid esters of phenol formaldehyde condensates of the novolak type may be used. These compounds may be prepared according to U.S. Pat. No. 3,448,079. 4,4'-dicyanatodiphenyl-alkanes such as 4,4'-dicyanatodiphenyl-dimethylmethane, 4,4'-dicyanatodiphenylethane, 4,4'-dicyanatodiphenylmethane are particularly suitable for the process of the invention. 4,4'-dicyanatodiphenyldimethyl-methane is of particular interest because it is able to form prepolymers which may be used with particular advantage for bonding purposes. Mixtures of above mentioned aromatic cyanic acid esters may also be used.

To prepare bonds, the cyanic acid esters used in accordance with the invention may be applied either as powders or in the form of solutions in suitable solvents, for example acetone, methyl-ethyl ketone or toluene, to the surfaces to be joined, which have been suitably cleaned, for example by degreasing with organic solvents, or pretreated, for example by roughening or chemical etching. When the adhesive is liquid, it can be applied with brushes, doctor knives, with a spatula or any other suitable applicator. After the solvents present in the adhesive layer, if any, have been evaporated off as completely as possible, the surfaces to be bonded are fixed in the required position under intimate contact and the bond is heated for a sufficient period at a temperature of up to 250° C for the purpose of hardening. In a modification of the bonding process, the powdered adhesive may be applied to already heated surfaces to be bonded.

During the period of heating which is always necessary in order to harden the bond, the adhesive may occasionally exude from the bonded joint, when monomeric low-melting cyanic acid esters are used, and as a result faulty bonds may be obtained. Accordingly, cyanic acid ester prepolymers are often used with advantage. For example, prepolymers of the kind that are highly viscous or may even be solid at 20° C can be obtained from 4,4'-dicyanato-diphenyl-dimethyl-methane simply by heating for several hours at temperatures of from 50° to 150° C. The prepolymers thus obtained are still soluble and, like the cyanic acid esters used according to the invention theselves, may be applied to the surfaces to be joined in solution, for example in acetone.

The cyanic acid esters used in accordance with the invention and their prepolymers, which as already mentioned may also be used with particular advantage on their own, may be modified by the addition of other materials, for example fillers such as quartz powder, ground shale, powdered asbestos or corundum powder, metal powders or even plasticizers. In addition, the requisite hardening temperatures may be lowered and the hardening times shortened by the optional addition of catalysts.

EXAMPLE 1

4,4'-dicyanato-diphenyl-dimethyl-methane is melted and heated for 48 hours at 120° C. A prepolymer, that is highly viscous when heated, is formed from the initially thinly liquid melt, solidifying on cooling into a brittle resin. This resin was used as an adhesive in the form of a 60% by weight solution in acetone.

To prepare test specimens, strips 9 cm. long and 2 cm. wide were cut from the materials to be bonded, namely Bondur (Al-Cu-MgO-alloy, material thickness 1.0 mm), steel (material thickness 0.15 mm), copper (material thickness 1.0 mm) and a glass-fiber-reinforced plastic obtained from 4,4'-dicyanato-diphenyl-dimethyl-methane (material thickness 4.0 mm) which in the following Table is referred to as high-tempera-ture-resistant plastic. The metals were first carefully degreased with trichloro-ethylene. Steel, copper and plastic were then thoroughly roughened with 100-grade emery. The Al-Cu-Mg alloy was etched by pickling with a solution of 27.5 parts by weight of concentrated sulphuric acid, 7.5 parts by weight of sodium dichromate and 65.0 parts by weight of distilled water for 20 minutes at 70° C, after which it was rinsed thoroughly with distilled water and then dried at 70° C.

The adhesive described above was applied with a brush and the coatings of adhesive were left in the open for 1 hour in order to evaporate the acetone present in them. The 1 cm² single-overlap bonds were then heated for 1 hour at 250° C under a pressure of 1 kp/cm² and then left for 1 day at 250° C.

The bonds were then heated for 3 hours at the temperatures specified in the following Table and their shear strength was immediately determined in a shear test in which the spindle was advanced at a rate of 20 mm per minute. The following results were obtained.

TABLE

| Material | Testing Temperature | Shear Strength |
| --- | --- | --- |
| Al-Cu-Mg-alloy | −60°C. | 171 kp/cm² |
| Al-Cu-Mg-alloy | +20°C. | 205 kp/cm² |
| Al-Cu-Mg-alloy | +200°C. | 220 kp/cm² |
| Al-Cu-Mg-alloy | +250°C. | 215 kp/cm² |
| Al-Cu-Mg-alloy | +300°C. | 280 kp/cm² |
| steel | −60°C. | 155 kp/cm² |
| steel | +20°C. | 180 kp/cm² |
| steel | +350°C. | 230 kp/cm² |
| copper | −60°C. | 167 kp/cm² |
| copper | +20°C. | 162 kp/cm² |
| copper | +150°C. | 174 kp/cm² |
| high-temperature resistant plastic | −60°C. | 250 kp/cm² |
| do. | +20°C. | 240 kp/cm² |
| do. | +200°C. | 245 kp/cm² |
| do. | +250°C. | 240 kp/cm² |

The elasticity of the adhesive layer was determined by the oscillating twisting test according to DIN 53 445.

| Temperature (°C) | Shear Modulus (dyn/cm²) |
| --- | --- |
| −100 | $1 \times 10^{-10}$ |
| +20 | $1 \times 10^{-10}$ |
| +100 | $9 \times 10^{-9}$ |
| +200 | $8 \times 10^{-9}$ |
| +250 | $7 \times 10^{-9}$ |

The adhesives used in accordance with the invention may be generally employed for bonding non-porous materials, including inter alia, glass, porcelain, ceramics, mica and high-temperature-resistant plastics.

EXAMPLE 2

1,3-dicyanatobenzene is melted and heated for 24 hours at 90° C. a prepolymer, that is highly viscous when heated, is formed from the initially thinly liquid melt, solidifying on cooling into a brittle resin. This resin may be used as an adhesive in the form of a 60 % by weight solution in acetone.

EXAMPLE 3

1,4-dicyanatobenzene is melted and heated for 48 hours at 110° C. A prepolymer, that is highly viscous when heated, is formed from the initially thinly liquid melt, solidifying on cooling into a brittle resin. This resin may be used as an adhesive in the form of a 60 % by weight solution in acetone.

EXAMPLE 4

1,1-bis-(4-cyanatophenyl)-ethane is melted and heated for 30 hours at 140° C. A prepolymer, that is highly viscous when heated, is formed from the initially thinly liquid melt, solidifying on cooling into a brittle resin. This resin may be used as an adhesive in the form of a 60 % by weight solution in acetone.

EXAMPLE 5

A mixture of 2 parts by weight of 4,4'-dicyanatodiphenyldimethylmethane and 1 part by weight of 4,4'-dicyanatodiphenylsulfone is melted and heated for 10 hours at 80° C. A prepolymer, that is highly viscous when heated, is formed from the initially thinly liquid melt, solidifying on cooling into a brittle resin. This resin may be used as an adhesive in the form of a 60 % by weight solution in acetone.

EXAMPLE 6

A 60 % solution of a novolak cyanate corresponding to a novolak prepared from equimolar quantities of phenol and formaldehyde in acetone is prepared which solution may be used as an adhesive.

EXAMPLE 7

A mixture of 3 parts by weight of 4,4'-dicyanatodi-phenyl-dimethylmethane and 1 part by weight of 1,5-dicyanatonaphthalene is melted and heated for 10 hours at 150° C. A prepolymer, that is highly viscous when heated, is formed from the initially thinly liquid melt, solidifying on cooling into a brittle resin. This resin may be used as an adhesive in the form of a 60 % by weight solution in acetone.

What is claimed is:

1. A process for bonding two non-porous materials together, said process comprising applying a polyfunctional aromatic cyanic acid ester to a bonding surface of at least one of said non-porous materials, bringing the bonding surfaces into intimate contact and curing said ester by heating at a temperature of up to 250° C.

2. The process of claim 1 wherein a monomeric polyfunctional aromatic cyanic acid ester is employed.

3. The process of claim 1 wherein said ester is a prepolymer obtained by heating a monomeric polyfunctional aromatic cyanic acid ester at a temperature of from 50° to 150° C.

4. The process of claim 1 wherein said ester is 4,4'-dicyanato-diphenyl-dimethylmethane.

* * * * *